US009802599B2

(12) United States Patent
Abou-Nasr et al.

(10) Patent No.: US 9,802,599 B2
(45) Date of Patent: Oct. 31, 2017

(54) VEHICLE LANE PLACEMENT

(71) Applicant: Ford Global Technologies, LLC, Dearborn, MI (US)

(72) Inventors: Mahmoud A. Abou-Nasr, Canton, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/064,139

(22) Filed: Mar. 8, 2016

(65) Prior Publication Data

US 2017/0259801 A1    Sep. 14, 2017

(51) Int. Cl.
| | |
|---|---|
| *B60R 22/00* | (2006.01) |
| *B60W 10/18* | (2012.01) |
| *B60W 10/20* | (2006.01) |
| *G01S 17/89* | (2006.01) |

(52) U.S. Cl.
CPC ............ *B60W 10/18* (2013.01); *B60W 10/20* (2013.01); *G01S 17/89* (2013.01); *B60W 2510/18* (2013.01); *B60W 2510/20* (2013.01); *B60W 2710/18* (2013.01); *B60W 2710/20* (2013.01)

(58) Field of Classification Search
USPC .......................................................... 701/41
See application file for complete search history.

(56) References Cited

U.S. PATENT DOCUMENTS

| 5,285,523 A | 2/1994 | Takahashi |
| 5,541,590 A | 7/1996 | Nishio |
| 5,983,161 A * | 11/1999 | Lemelson ............... G01S 19/11 340/436 |

(Continued)

FOREIGN PATENT DOCUMENTS

| CN | 101419679 B | 11/2011 |
| CN | 102201167 B | 3/2013 |

(Continued)

OTHER PUBLICATIONS

CS1114 Section 6: Convolution; Feb. 27, 2013.
UKIPO Search Report Under Section 17(5) for Application No. GB1703555.1 dated Aug. 22, 2017 (5 pages).

*Primary Examiner* — Tyler Paige
(74) *Attorney, Agent, or Firm* — Frank A. MacKenzie; Bejin Bieneman PLC (57) ABSTRACT

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes sends video data and light detecting and ranging (LIDAR) data to a recurrent neural network (rnn) that includes feedback elements to identify a roadway feature. The system also sends the data to a dynamic convolutional neural network (dcnn) to identify the feature. Output values are sent to a softmax decision network to aggregate the rnn and the dcnn output values and determine a vehicle positional location on the roadway.

20 Claims, 5 Drawing Sheets

(56) References Cited

U.S. PATENT DOCUMENTS

| | | | |
|---|---|---|---|
| 2002/0022927 A1 | 2/2002 | Lemelson et al. | |
| 2002/0198632 A1* | 12/2002 | Breed | B60N 2/2863 |
| | | | 701/1 |
| 2007/0219720 A1* | 9/2007 | Trepagnier | B60W 30/00 |
| | | | 701/300 |
| 2008/0161986 A1* | 7/2008 | Breed | G08G 1/161 |
| | | | 701/23 |
| 2009/0140887 A1* | 6/2009 | Breed | G01C 21/165 |
| | | | 340/990 |
| 2010/0104199 A1* | 4/2010 | Zhang | G06K 9/00798 |
| | | | 382/199 |
| 2010/0191391 A1* | 7/2010 | Zeng | G01S 13/723 |
| | | | 701/1 |
| 2015/0166062 A1* | 6/2015 | Johnson | B60W 30/12 |
| | | | 701/41 |
| 2016/0054452 A1 | 2/2016 | Cosatto et al. | |
| 2016/0096270 A1* | 4/2016 | Ibarz Gabardos | B25J 9/163 |
| | | | 700/253 |

FOREIGN PATENT DOCUMENTS

| | | |
|---|---|---|
| CN | 103413441 A | 11/2013 |
| JP | 8202877 | 8/1996 |
| KR | 101178507 | 8/2012 |
| KR | 101261409 | 4/2013 |
| WO | 2013110072 A1 | 7/2013 |

\* cited by examiner

VEHICLE LANE PLACEMENT

BACKGROUND

A vehicle's position can be obtained in several ways, including a global navigation satellite system (GNSS) or a Global Positioning System (GPS) receiver, a dead reckoning system, and/or an inertial navigation system that calculates a number of tire rotations to determine the distance from a known starting reference point. However, these techniques lack an accuracy that can determine the vehicle placement between a lane marker and the edge of a roadway.

DETAILED DESCRIPTION

Real Time Road Identification System

Figure 1:
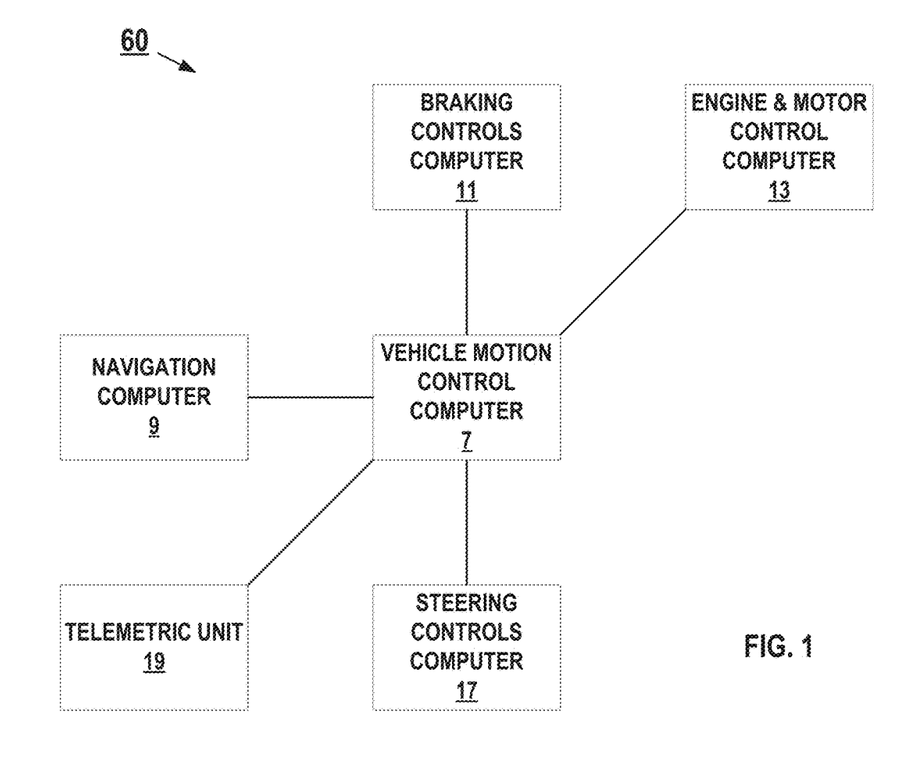
FIG. 1 is a block diagram of an exemplary autonomous vehicle with various computer hardware components which can control and monitor various systems of an autonomous vehicle.

The illustration of FIG. 1 is schematic diagram of an exemplary vehicle computer system 60 of an autonomous vehicle or a semiautonomous vehicle with various vehicle computer modules connected to and through a motion control computer 7, which can also be referred to as an electronic control unit (ECU). The motion control computer 7 can have the responsibility of monitoring and controlling the other computer controllers. The motion computer 7 has at least one processor and can have various types of permanent and transient memory to store computer instructions, register values, temporary variable and permanent variables. Further, the motion control computer 7 can generally include instructions for exchanging data, e.g., from and to an occupant, for example via a wearable device, a user devices and/or Human Machine Interface inside the vehicle, which may be one or more of an interactive voice response (IVR) system, a graphical user interface (GUI) including a touch-screen or the like, etc.

The motion control computer 7 is connected to a navigation computer 9, a braking controls computer 11, an engine and motor control computer 13, a steering computer 15 and a telemetric unit 19. The navigation computer 9 can receive, for example a signal from Global Navigation Satellite System (GNSS) to determine the vehicle's geographic location or in the alternative, the navigation computer 9 can deploy a dead reckoning system for determining the geographical location.

The braking controls computer 11 can monitor and control the vehicle's brakes, as well as any parameters affecting the stopping of the vehicle. The engine and motor control computer 13 can monitor and control the engines and the motors along with the powertrain system of the vehicle. The steering controls computer 17 can monitor and control the steering system of the vehicle as well as generate a steering profile which can be sent to the motion control compute 7 to use when routes and maneuvers. The telemetric unit 19 or the like is provided for sending and receiving information to a network (not shown) e.g., in a known manner. The vehicle can communicate with other networks or vehicles, and may include wireless networking technologies, e.g., cellular, Wi-Fi, Bluetooth, Near Field Communication (NFC), wired and/or wireless packet networks, etc.

Figure 2:
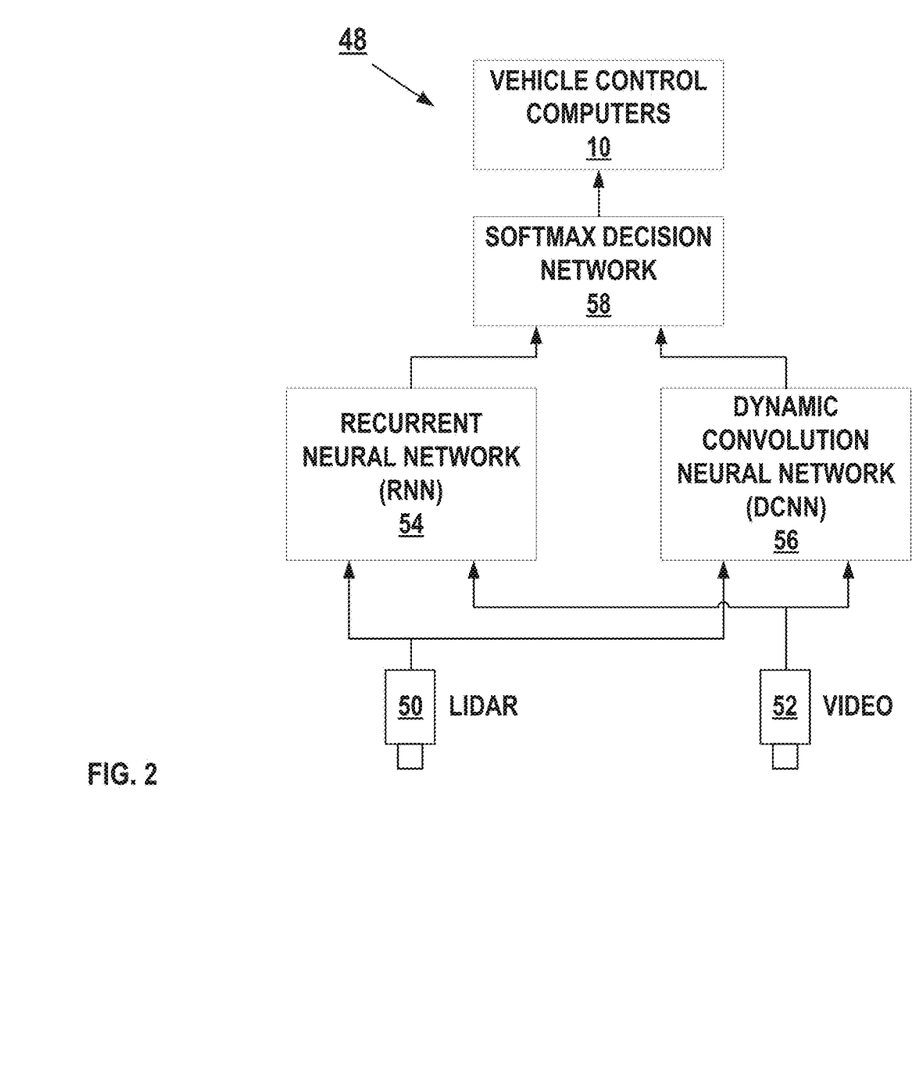
FIG. 2 is a schematic diagram of an exemplary real time road identification system which can classify features of a vehicle's surroundings.

FIG. 2 is a schematic diagram of a real time road identification system 48 which can classify roadway features of a vehicle's surroundings, for example, the system 48 can determine a roadway's curb and a lane marker, such as a left lane marker. The system 48 can determine that the vehicle's placement on the roadway independent of a vehicle's navigation system. The roadway features are extracted from sensor data from a light detecting and ranging (LIDAR) image capture device 50 and from image data from a video data source, for example, a camera or an image capture device 52. LIDAR data from the LIDAR device 50 and the video image capture device 52 is processed by both a recurrent neural network (RNN) 54 and by a dynamic convolutional neural network (DCNN) 56. The outputs of the RNN 54 and the DCNN 56 are then processed and aggregated by a softmax decision network (SDN) 58. The output of (SDN 58 is then applied to a vehicle computer system 60, which in turn can operate the autonomous vehicle.

The LIDAR device 50 is, as is known, a remote sensing unit that emits intense, focused beams of light and measures the time it takes for the reflections to be detected by a sensor. This information is used to compute ranges, or distances, to objects. In this manner, LIDAR is analogous to radar (radio detecting and ranging), except that it is based on discrete pulses of laser light. A set of three-dimensional coordinates, e.g., a set of x, y, z coordinates, or a latitude, a longitude, and an elevation of an object, are computed from a time difference between the laser pulse being emitted and returned, an angle at which the pulse was "fired," and the absolute location of the sensor.

The video image capture device 52 can be any type of camera to capture images electronically, e.g., a front grill-mounted camera or a windshield camera. The video image capture device 52 can also be a stereoscopic camera system, which permits the video image capture device 52 to achieve depth perception. In addition, the video image capture device 52 can be tuned for non-visible radiation, i.e., infrared for improved night vision and sensing.

Figure 3:
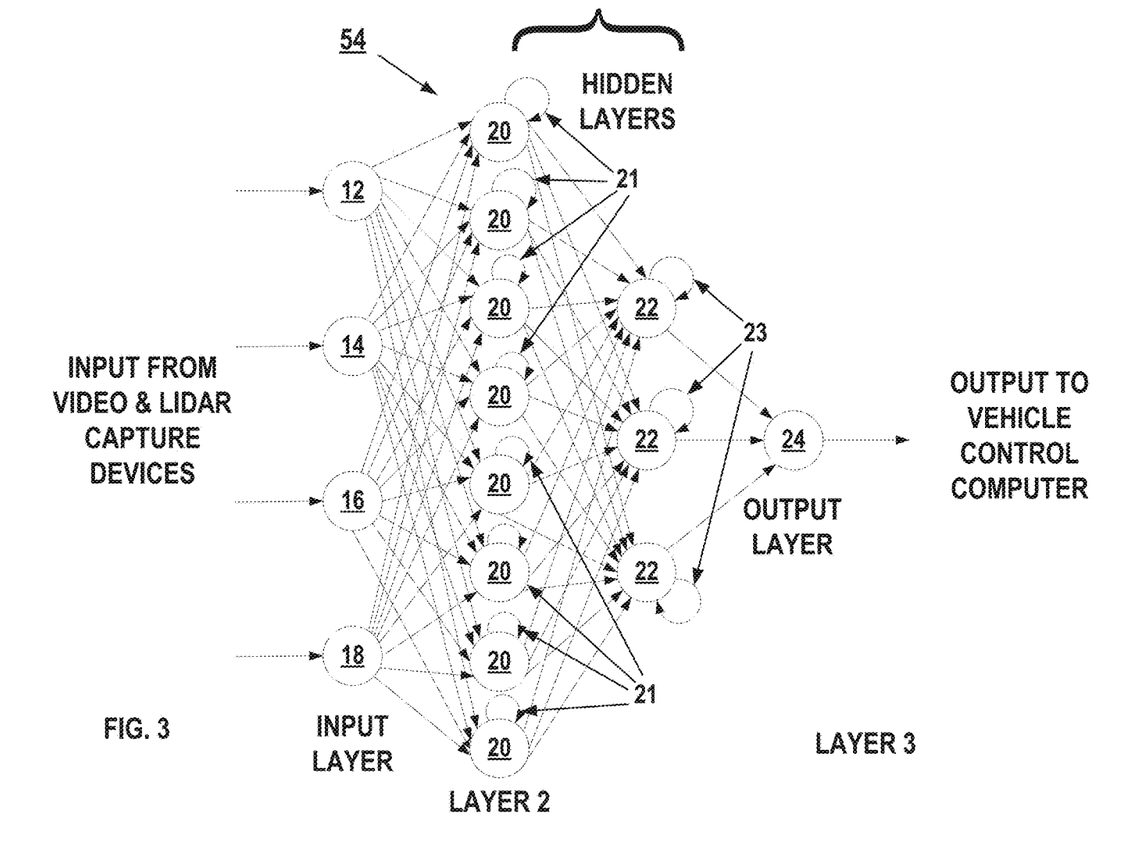
FIG. 3 is a schematic diagram of an exemplary recurrent neural network having four layers.

The recurrent neural network 54 is a class of artificial neural networks where the network has feedback elements that enable signals from one layer to be fed back to a current layer. An exemplary recurrent neural network 54 having four layers is shown in FIG. 3. The network 54 has a series of input neurons 12, 14, 16, 18 as an input layer to receive data from the LIDAR device 50 and the video image device 52. The first layer is coupled to a first middle layer of neurons 20, which is coupled to a second layer of neurons 22. The second layer of neurons is coupled to an output layer of neurons 24. The middle layers of neurons 20, 22 are also known as hidden layers.

The term "neuron" in the above context refers to an artificial neuron as is known, that receives one or more inputs, representing dendrites, and sums them to produce an output representing a neuron's axon. The sums of each node can be weighted and the sum is passed through a non-linear function known as an activation function or transfer function. The transfer functions usually have a sigmoid shape, but they may also take the form of other non-linear functions, for example, a piecewise linear function or a step function. The non-linear function's purpose is make the artificial neuron's output be either "true" or "false," or "1" or "0."

A feedback path 21, 23 can be provided in the hidden layers which can be multiplied by a fixed weight value of one. Therefore, the feedback creates an internal memory state of the neural network 54 which allows it to exhibit a dynamic temporal behavior. Therefore the neural network 54 can store values or states into memory and later use the stored values and states when processing information.

The recurrent neural network 54 can be designed to process patterned information that is distributed across networks of neurons. For example, an image is meaningless as a collection of independent pixels; to understand images, the recurrent neural network 54 can process a spatial pattern of inputs that is received from the LIDAR device 50 and the video device 52. Within the context of a spatial pattern, the information from each pixel can acquire meaning. The same is true during temporal processing. For example, an individual pixel without its accompanying pixels may appear as a simple meaningless grayscale pixel. The collections of an image's pixels form a characteristic temporal pattern of signals in which it can differentiate other stored images.

Figure 4:
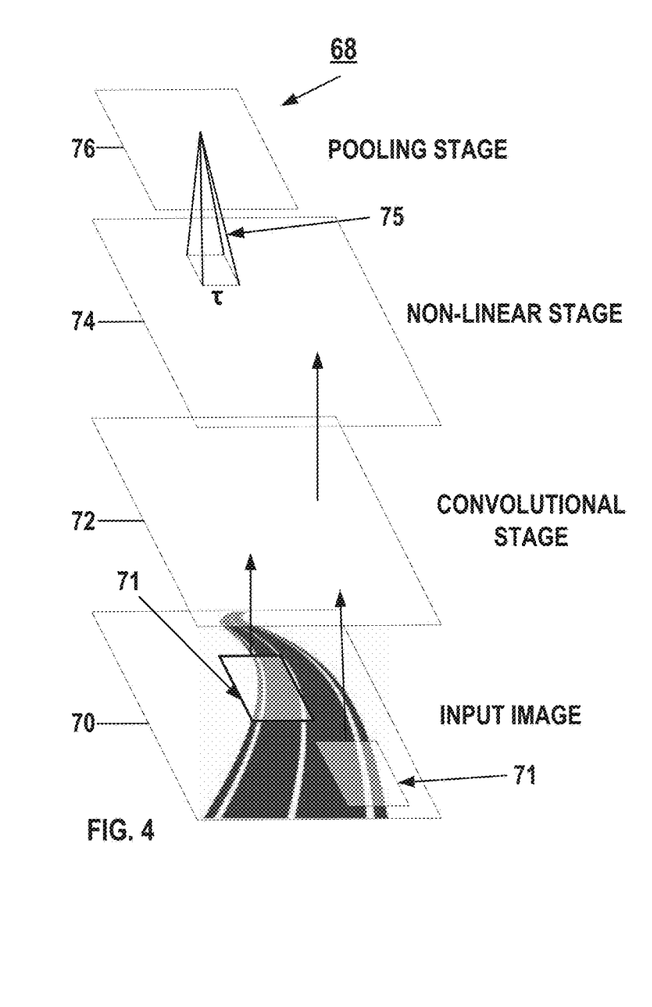
FIG. 4 is an illustration of the sections of an exemplary dynamic convolutional neural network.

The dynamic convolutional neural network 56 is a class of artificial networks that uses many identical copies of a same neuron. The dynamic convolutional neural network 56 can express computationally large models with lesser number of parameters. FIG. 4 illustrates an exemplary dynamic convolutional neural network process 68 which can be deployed in the dynamic convolutional neural network 56.

In the convolutional process 68, an input image 70 has a filter 71 convolutionally applied across the input image 70 to produce a convolution image 72. The convolutional process 68 sequences and/or combines the filter 71 values with values of the input image 70. It can be thought of as with a small window looking at discrete portions of the input image 70 and preforming some mathematical process to the discrete portions to produce the convolution image 72.

A non-linear stage can be deployed to introduce a bias or weighting into the convolution image 72 to produce a non-linear image 74. The weighting can be can be applied through a non-linear function, e.g., a transfer function, much like the weighting in the recurrent neural network 54 from above. The transfer functions usually have a sigmoid shape, but they may also take the form of other non-linear functions, for example, a piecewise linear functions or a step function.

In a pooling stage, a pooling filter 75, much like the process in the convolution process, methodically processes the non-linear image 74 looking for regions which may contain invariant permutations that can be decimated or down sampled. Invariant permutations can be pixels that are superfluous or irrelevant to the non-linear image 74, for example, extra pixels adjacent to a clearly defined border that were generated by a noisy analog to digital conversion process inside the video image capture device 52. The output of the pooling stage is a feature map 76

The outputs of the recurrent neural network 54 and the dynamic convolutional neural network 56 are processed by the softmax decision network 58. The softmax decision network 58, as is known, determines if the output values of the recurrent neural network 54 and the dynamic convolutional neural network 56 are within a desired range. For example, the pooling stage of the dynamic convolutional neural network 54 has a data value is 0.21, which is outside an acceptable data range of the system 48 which defaults to a "0" data value when the pooling stage data value is between 0.0 and 0.1 and to a "1" when the pooling data value is between 0.9 and 1.0. The softmax decision network 58 can determine that the 0.21 data value is an anomaly and changes the data value to a "0" allowing for the system 48 to use.

An output of the softmax decision network 58 is sent to a v vehicle computer system 60. The vehicle computer system 60 in conjunction with the navigation computer 9 can effectively autonomously operate the accelerator, brakes and steering of the vehicle and cause the vehicle to effectively drive on a roadway by detecting a left lane marker and a right lane marker and keeping the vehicle in between the two.

Process Flows

Figure 5:
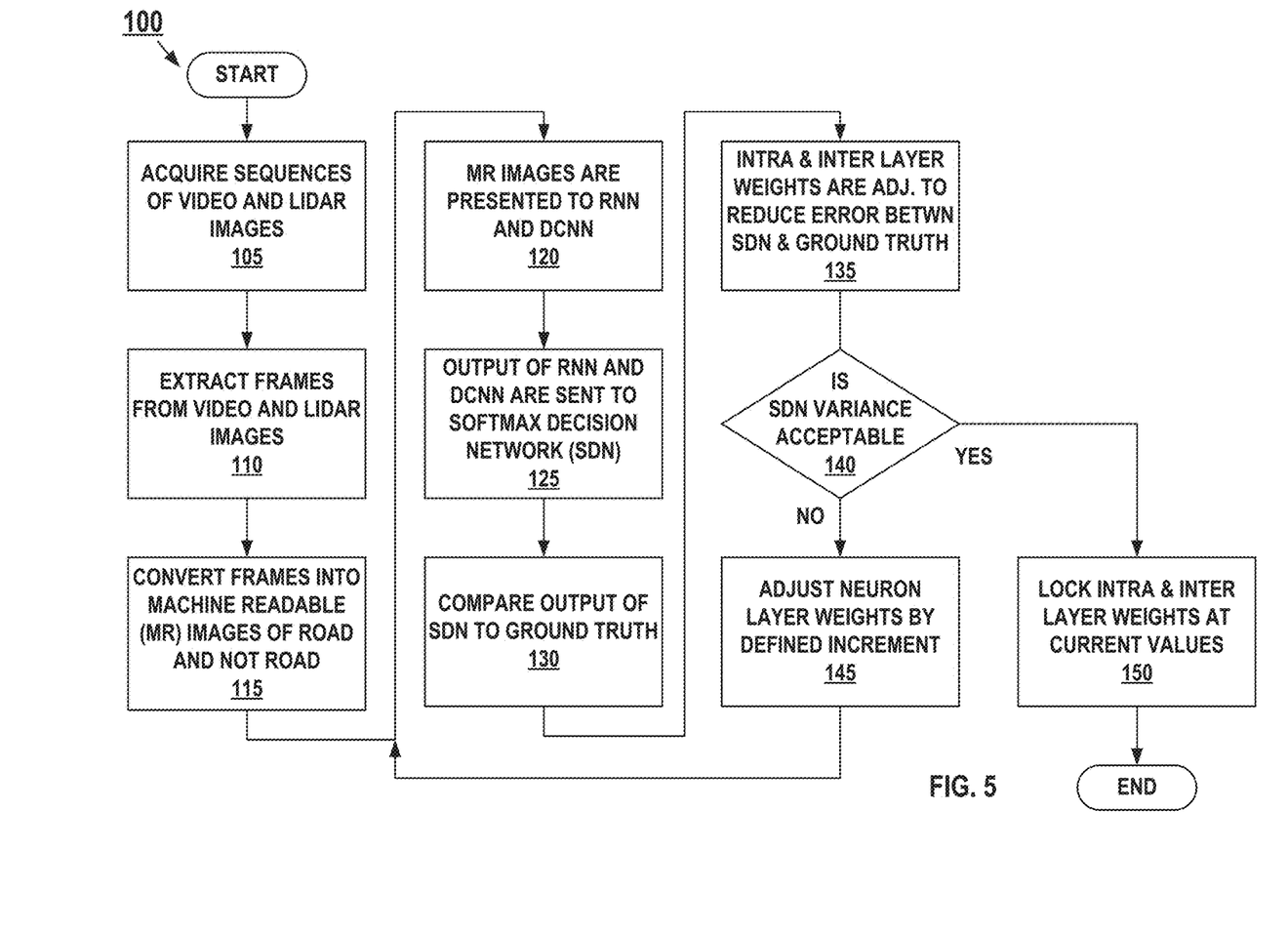
FIG. 5 is a flowchart of an exemplary process that may be implemented by a vehicle's computer.

FIG. 5 is a flow chart illustrating an exemplary process 100 which can be executed by the vehicle computer system 60 to process a set of training data images injected into the LIDAR device 54 and the video capture device 52 to learn roadway features, such as lane markers, curbs and roadway edges. The training data images are a set of images with identified roadway features. Therefore, the vehicle computer system 60 can classify the roadway features of the set of training data images, compare the vehicle computer system 60 classifications against the actual training data images identified roadway features, and in turn, train the neural networks to be able to identify roadway features in real time. The set of training data images along with a set of training data regarding the training data images can contain, for example, many images of "real life" images of identified roadway features, such as the lane markers, curbs and roadway edges.

The process 100 begins in a block 105 in which the set of training data images are presented to both a LIDAR data source, for example the LIDAR capture device 50, and to the video capture device 52 or by injecting the training data images into image processing devices located in the LIDAR capture device 50 and the video capture device 52. In other words, the training data images are either physically in front of each lens of each device or a digitized version of the training data images are applied directly to the imaging software or hardware of each device, bypassing the lenses.

Next in a block 110, a video frame image is extracted from the video frame data and a LIDAR frame image is extracted from the LIDAR frame data of the training data images are extracted from the each of the LIDAR capture device 50 and the video capture device 52. The set of frames images can be, for example, a frozen image captured by the LIDAR capture device 50 and the video capture device 52.

Next, in the block 115, the vehicle computer system 60 converts the set of frame images into a machine readable images of roadway and further removes portions of the images or complete images which are not of a roadway. For example, images above the horizon can be discarded because images of the sky are not helpful in determining the vehicle positional location on the roadway.

Next, in a block 120, the machine readable images are sent to the recurrent neural network (RNN) 54 and the dynamic convolution neural network (DCNN) 56. The recurrent neural network 54 and the dynamic convolution neural network 56 are discussed above.

Next in a block 125, the outputs of the recurrent neural network 54 and the dynamic convolution neural network 56 are applied to the softmax decision network (SDN) 58. The softmax decision network (SDN) 58 is discussed above.

Next, in a block 130, which can follow in the block 125 or in a block 145, the vehicle computer system 60 compares the output of the softmax decision network (SDN) 58 to the training data with regards to each image in the set of training data images and determines a statistical accuracy of the image determination. As discussed above, the set of training data images can contain, for example, many images of "real life" images of identified roadway features, such as the lane markers, curbs and roadway edges.

Next, in a block 135, weights of the neural networks are adjusted to reduce the error rate between the SDN's prediction/classification and ground truth.

Next, in a block 140, the training algorithm determines if the error rate of recognized identified roadway features is within predefined statistically acceptable norms, for example, the error rates are tunable threshold parameters that defines the minimal error between the training data and the output of the network beyond which the approximation provided by network is considered acceptable. If the error rate is not acceptable, the process continues to in the block 145, else the process 100 continues on to in a block 150.

In the block 145, the weights of the neural networks are adjusted accordingly, for example, the adjusted weighting value is applied to the second middle layer of neuron 22, the first middle layer 20 and the feedback path 23. The application of a weight value in a neural network can be, for example, a simple multiplier which is applied each time the neuron 22 generates an output to the output neuron 24. The process then returns to in the block 120 to perform another comparison of the image to the roadway features test image with the changed weight values.

In the block 150, the weights which have determined the acceptable error are stored in memory of the vehicle computer system 60 for later use or stored in a register memory of the neurons and the process 100 ends.

Figure 6:
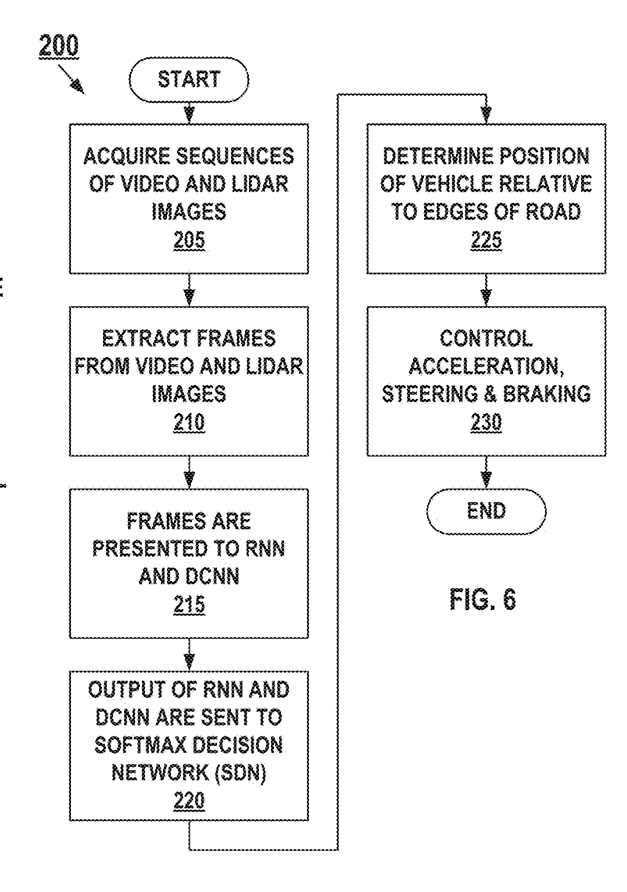
FIG. 6 is a flowchart of a second exemplary process that may be implemented by a vehicle's computer.

FIG. 6 is a flow chart illustrating an exemplary process 200 that can be executed by the vehicle computer system 60 for determining the location of the vehicle on a roadway by capturing LIDAR images and video images of the vehicles surroundings, processing LIDAR images and video in a trained recurrent neural network 54 and a trained dynamic convolution neural network 56, and then making decisions about the output of the neural networks 54, 56 in a softmax decision network 58. The vehicle computer system 60 can determine the vehicle's position from roadway features, such as lane markers, curbs and roadway edges with a set of truth images to and determine the vehicle's relative position in the lane.

The process 200 begins in a block 205, in which the LIDAR capture device 50 and the video capture device 52 can capture a forward facing image (relative to the vehicle) of the roadway its surroundings.

Next in a block 210, the vehicle computer system 60 receives frames of video and LIDAR images from a LIDAR image capture device 50 and the video capture device 52 and extracts frame data from the video and LIDAR images.

Next, in a block 215, the vehicle computer system 60 presents the frame data from both the trained recurrent neural network 54 and the trained dynamic convolution neural network 56. The recurrent neural network 54 and the dynamic convolution neural network 56 are discussed above.

Next, in the block 220, the outputs of the recurrent neural network 54 and the dynamic convolution neural network 56 are applied to the softmax decision network (SDN) 58. The softmax decision network (SDN) 58 is discussed above.

Next, in the block 225, the vehicle computer system 60, based upon output of the SDN 58 determines the vehicle position relative to the edge of the road and the right and left lane markers and uses the information in the vehicle's decision making, for example, if the SDN 58 determines the road way is turning, the autonomous vehicle will be instruct to turn and follow the road's curvature.

Next in a block 230, the motion control computer 7 receives the vehicle's geographical location from the navigation computer 9. The motion control computer 7 sends instructions to the braking controls computer 11 to decelerate the vehicle by actuating braking mechanisms at the appropriate times as determined by the motion control computer 7 in conjunction with the navigation computer 9. The engine and motor control computer 13 will accelerate and decelerate the vehicle at the appropriate times by accelerating and decelerating the motors, the engines and controlling the transmission of the vehicle as determined by the motion control computer 7 in conjunction with the navigation computer 9. The steering computer 15 will effectuate the appropriate right and left turns of the vehicle and return the vehicle to straight travel as necessary, as determined by the motion control computer 7 in conjunction with the navigation computer 9 and at the end of the journey, the process 200 ends.

CONCLUSION

As used herein, the adverb "substantially" modifying an adjective means that a shape, structure, measurement, value, calculation, etc. may deviate from an exact described geometry, distance, measurement, value, calculation, etc., because of imperfections in the materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Python, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer having a processor and a memory, the memory storing instructions executable by the processor including instructions to:
    receive video data from a video data source affixed to a vehicle;
    receive light detecting and ranging (LIDAR) data from a LIDAR data source affixed to the vehicle;
    send the video data to a recurrent neural network (RNN) that includes feedback elements to provide feedback from a first layer to a second layer to identify a roadway feature;
    send the video data to a dynamic convolutional neural network (DCNN) to apply a convolution filter to the video data to generate a convolution image and a pooling filter to the convolution image to develop a feature map to identify the feature;
    send the LIDAR data to the RNN to identify the feature;
    send the LIDAR data to the DCNN to identify the feature;
    send a RNN output value and a DCNN output value to a softmax decision network to aggregate the RNN output value and the DCNN output value;
    determine a softmax output based on whether the RNN output value and the DCNN output value are within a range;
    determine a vehicle positional location on the roadway of the vehicle based on the softmax output;
    compare the vehicle positional location on the roadway relative to an edge of the roadway and an image from a set of training data images to determine an error rate;
    determine a change in a weight value for the RNN and the DCNN from the error rate;
    apply the change in the weight value to the RNN and the DCNN; and
    control at least a steering, a braking and an acceleration of the vehicle from at least the vehicle positional location of the vehicle.

2. The system of claim 1, wherein the video data source is at least a camera affixed to the vehicle or the set of training data images.

3. The system of claim 1, wherein the LIDAR data source is at least a LIDAR image capture device affixed to the vehicle and the set of training data images.

4. The system of claim 1, wherein the feature includes at least one of a lane marker, a curb, and a roadway edge.

5. The system of claim 1, wherein the computer aggregates the RNN output value and the DCNN output to produce a softmax output value.

6. The system of claim 1, the computer extracts a video frame image from the video data and a LIDAR frame image from the LIDAR data.

7. The system of claim 6, the computer converts the video frame image and the LIDAR frame image into a machine readable image.

8. The system of claim 7, the computer sends the machine readable image to a RNN input and a DCNN input.

9. The system of claim 1, the memory further storing instructions to store the weight value for the RNN and the DCNN in a memory.

10. A system, comprising a computer having a processor and a memory, the memory storing instructions executable by the processor including instructions to:
    receive video data from a camera affixed to a vehicle;
    receive light detecting and ranging (LIDAR) data from a LIDAR image capture device affixed to the vehicle;
    send the video data to a recurrent neural network (RNN) that includes feedback elements that enable signals from a first layer to be fed back to a second layer to identify a roadway feature;
    send the video data to a dynamic convolutional neural network (DCNN) to apply a convolution filter to the video data to generate a convolution image and a pooling filter to the convolution image to develop a feature map to identify the roadway feature;
    send the LIDAR data to the RNN to identify the feature;
    send the LIDAR data to the DCNN to identify the feature;
    send a RNN output value and a DCNN output value to a softmax decision network to determine a softmax output from at least the RNN output value and the DCNN output value;
    determine a vehicle position on the roadway of the vehicle from the softmax output; and
    control at least a steering, a braking and an acceleration of the vehicle from at least the vehicle positional location of the vehicle.

11. The system of claim 10, wherein the feature includes at least a lane marker, a curb and a roadway edge.

12. A method, comprising:
    receiving video data from a video data source on a vehicle;
    receiving light detecting and ranging (LIDAR) data from a LIDAR data source on the vehicle;
    sending the video data to a recurrent neural network (RNN) that includes feedback elements that enable signals from a first layer to be fed back to a second layer to identify a roadway feature;
    sending the video data to a dynamic convolutional neural network (DCNN) to apply a convolution filter to the video data to generate a convolution image and a pooling filter to the convolution image to develop a feature map to identify the roadway feature;

sending the LIDAR data to the RNN to identify the roadway feature;

sending the LIDAR data to the DCNN to identify the roadway feature;

sending a RNN output value and a DCNN output value to a softmax decision network to determine a softmax output from at least the RNN output value and the DCNN output value;

determining a vehicle positional location on the roadway of the vehicle from the softmax output;

comparing the vehicle positional location on the roadway and an image from a set of training data images to determine an error rate;

determining a change in a weight value for the RNN and the DCNN from the error rate;

applying the change in the weight value to the RNN and the DCNN; and control at least a steering of the vehicle from at least the vehicle positional location of the vehicle.

13. The method of claim 12, further comprising controlling at least an acceleration and a braking of the vehicle.

14. The method of claim 12, wherein the video data source is at least a camera affixed to the vehicle or the set of training data images.

15. The method of claim 12, wherein the LIDAR data source is at least a LIDAR image capture device affixed to the vehicle and the set of training data images.

16. The method of claim 12, wherein the roadway feature includes at least a lane marker, a curb and a roadway edge.

17. The method of claim 12, further comprising determining the softmax output by averaging the RNN output value and the DCNN output.

18. The method of claim 12, further comprising extracting a video frame image from the video data and a LIDAR frame image from the LIDAR data.

19. The method of claim 18, further comprising converting the video frame image and the LIDAR frame image into a machine readable images.

20. The method of claim 12, further comprising storing the weight value for the RNN and the DCNN in a memory.

* * * * *